United States Patent
Sharp

(10) Patent No.: US 9,308,790 B1
(45) Date of Patent: Apr. 12, 2016

(54) TOWING ASSEMBLY

(71) Applicant: Don Sharp, Lancaster, CA (US)

(72) Inventor: Don Sharp, Lancaster, CA (US)

( * ) Notice: Subject to any disclaimer, the term of this patent is extended or adjusted under 35 U.S.C. 154(b) by 0 days.

(21) Appl. No.: 14/534,821

(22) Filed: Nov. 6, 2014

(51) Int. Cl.
*B60D 1/167* (2006.01)
*B60D 1/00* (2006.01)

(52) U.S. Cl.
CPC .......... *B60D 1/167* (2013.01); *B60D 2001/005* (2013.01)

(58) Field of Classification Search
CPC ............. B60D 1/167; B60D 2001/005; B60D 2001/001
USPC .......................................................... 280/514
See application file for complete search history.

(56) References Cited

U.S. PATENT DOCUMENTS

| | | | | |
|---|---|---|---|---|
| 4,174,120 A | | 11/1979 | Freeman | |
| 4,856,805 A | * | 8/1989 | Davis | B60D 1/54 280/491.4 |
| 5,071,153 A | * | 12/1991 | Duncan | B60D 1/54 280/491.4 |
| 5,232,240 A | * | 8/1993 | Johnson | B60D 1/54 280/491.4 |
| 5,516,140 A | * | 5/1996 | Hinte | B60D 1/02 280/491.1 |
| 5,573,078 A | * | 11/1996 | Stringer | B60K 1/00 180/11 |
| 5,957,477 A | * | 9/1999 | Ensz | B60D 1/155 280/482 |
| 6,022,031 A | * | 2/2000 | Reiland | B62B 3/144 280/33.993 |
| 6,702,313 B2 | | 3/2004 | Forshee et al. | |
| 7,219,754 B2 | * | 5/2007 | Johnson | A61G 7/08 180/19.2 |
| 7,226,059 B1 | | 6/2007 | Samuch | |
| 7,510,204 B2 | * | 3/2009 | Inoue | B60D 1/00 280/491.3 |
| 7,571,914 B2 | | 8/2009 | Holtan et al. | |
| D610,953 S | | 3/2010 | Eckhart | |
| 7,837,216 B1 | * | 11/2010 | Greaves, Jr. | B60D 1/167 280/491.3 |
| 8,360,459 B2 | * | 1/2013 | Holtan | B60D 1/02 280/458 |
| 8,403,343 B1 | | 3/2013 | Seawel | |
| 8,690,181 B1 | * | 4/2014 | Roeber | B60D 1/145 280/456.1 |
| 8,870,209 B2 | * | 10/2014 | Conrad | B60D 1/167 280/250.1 |
| 2005/0206103 A1 | | 9/2005 | Schmidt et al. | |
| 2006/0244226 A1 | | 11/2006 | Ondrasik | |

FOREIGN PATENT DOCUMENTS

EP 0203834 4/1986

* cited by examiner

*Primary Examiner* — Anne Marie Boehler
*Assistant Examiner* — Michael Stabley

(57) ABSTRACT

A towing assembly includes a hitch that may be removably coupled to a first cart. A first rod is removably coupled between the hitch and a second cart to facilitate towing of the second cart with the first cart. The first rod is structured to be quickly coupled and de-coupled from the first cart and the second cart. A pivot is coupled to the first rod. A second rod is coupled to the pivot such that the second rod is pivotally coupled to the first rod. The second rod is positionable in a deployed position with respect to the first rod. The second rod is removably coupled to the second cart. The second rod is structured to be quickly coupled and de-coupled from the second cart.

6 Claims, 4 Drawing Sheets

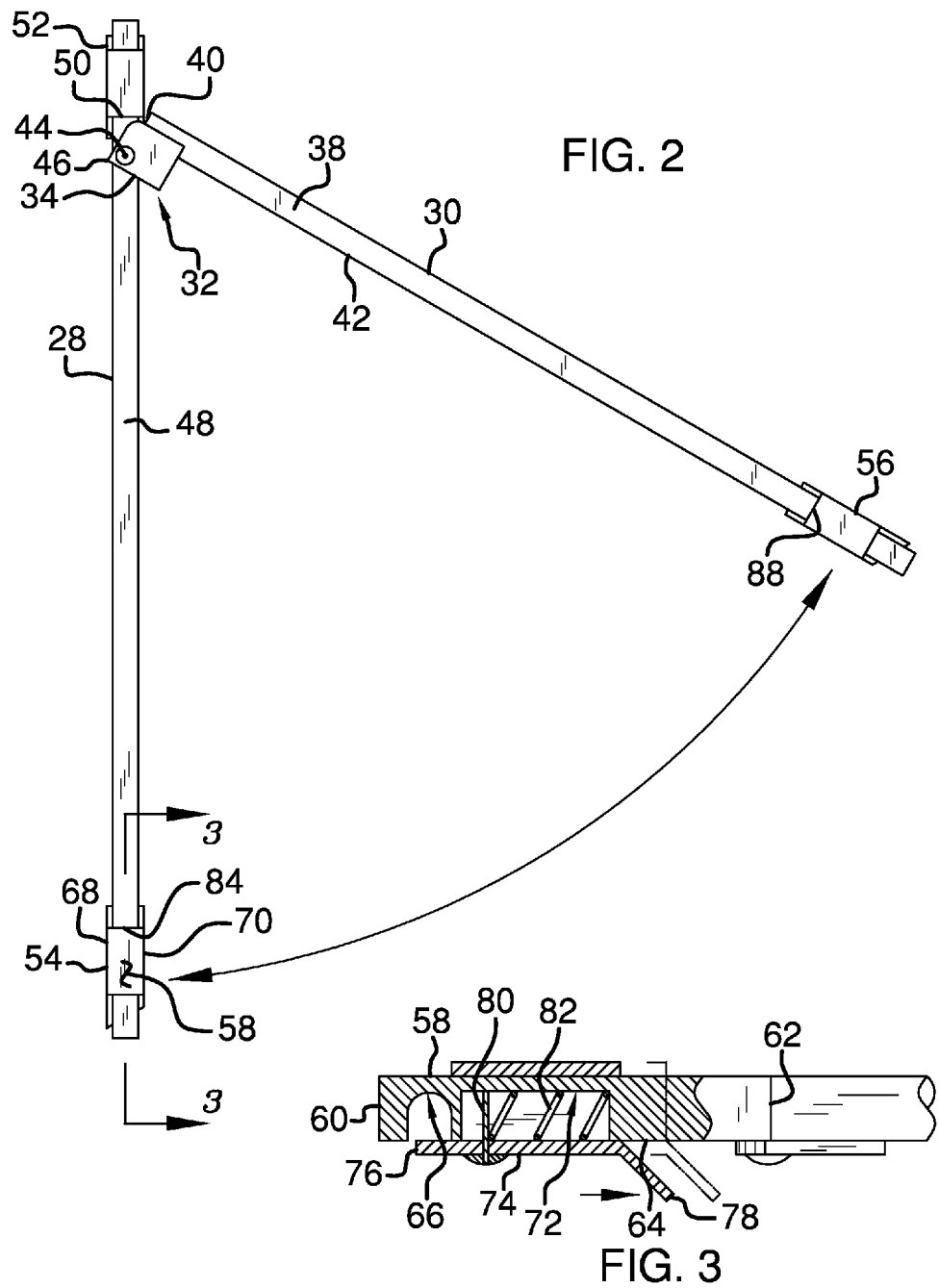

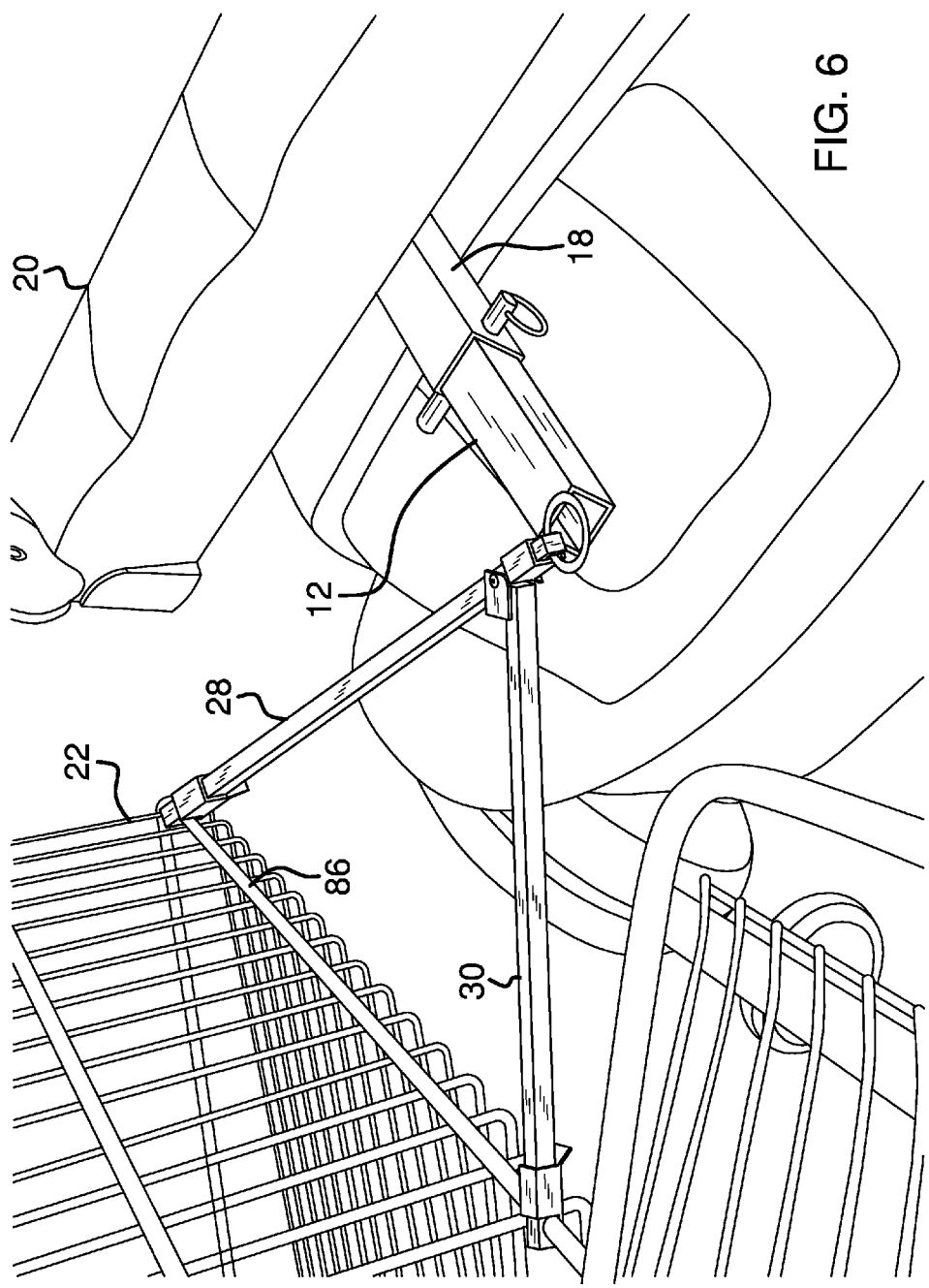

TOWING ASSEMBLY

BACKGROUND OF THE DISCLOSURE

Field of the Disclosure

The disclosure relates to towing devices and more particularly pertains to a new towing device for towing a shopping cart with a mobility cart.

SUMMARY OF THE DISCLOSURE

An embodiment of the disclosure meets the needs presented above by generally comprising a hitch that may be removably coupled to a first cart. A first rod is removably coupled between the hitch and a second cart to facilitate towing of the second cart with the first cart. The first rod is structured to be quickly coupled and de-coupled from the first cart and the second cart. A pivot is coupled to the first rod. A second rod is coupled to the pivot such that the second rod is pivotally coupled to the first rod. The second rod is positionable in a deployed position with respect to the first rod. The second rod is removably coupled to the second cart. The second rod is structured to be quickly coupled and de-coupled from the second cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a cross sectional view taken along line 3-3 of FIG. 2 of an embodiment of the disclosure.

FIG. 6 is an in-use view of an embodiment of the disclosure.

DESCRIPTION OF THE PREFERRED EMBODIMENT

Figure 1:
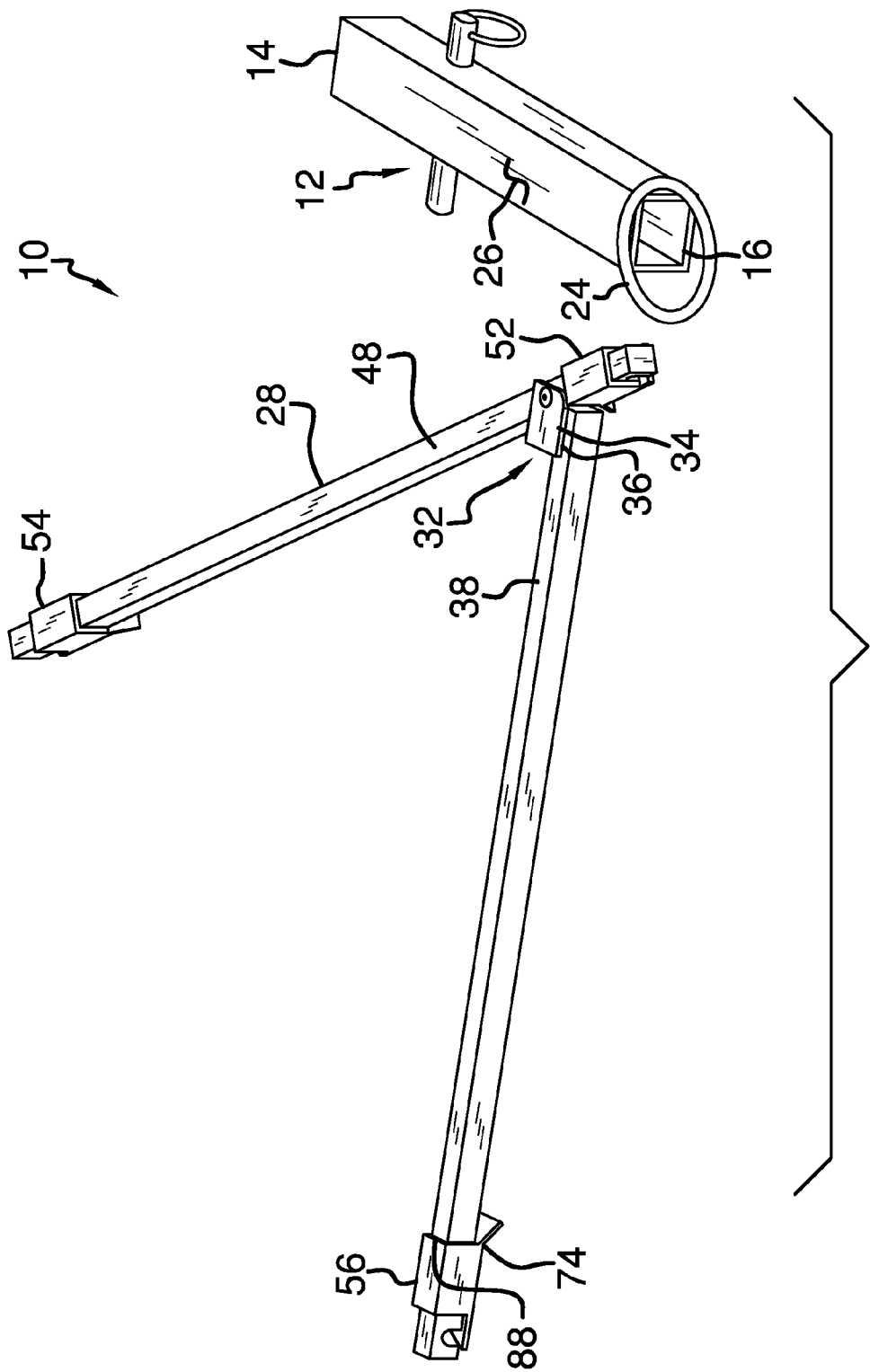
FIG. 1 is a perspective view of a towing assembly according to an embodiment of the disclosure.
Figure 4:
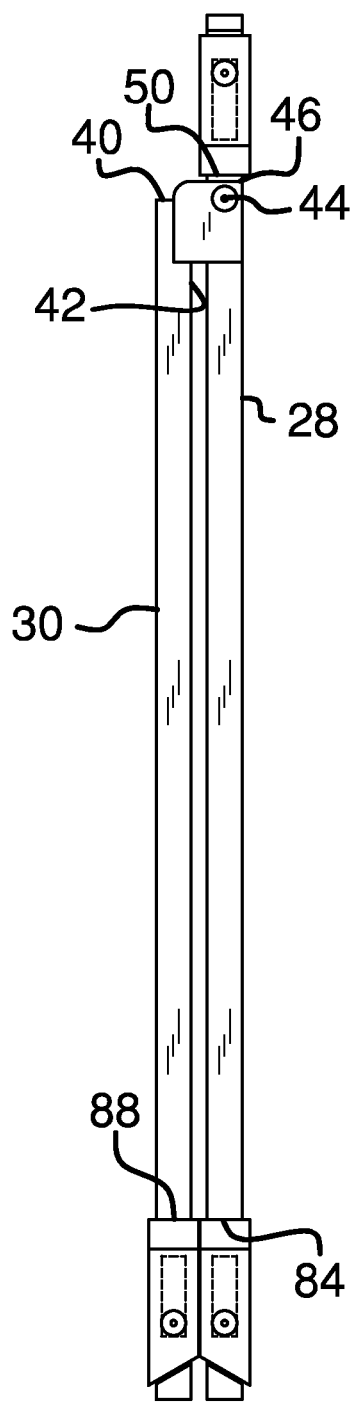
FIG. 4 is a bottom view of an embodiment of the disclosure.
Figure 5:
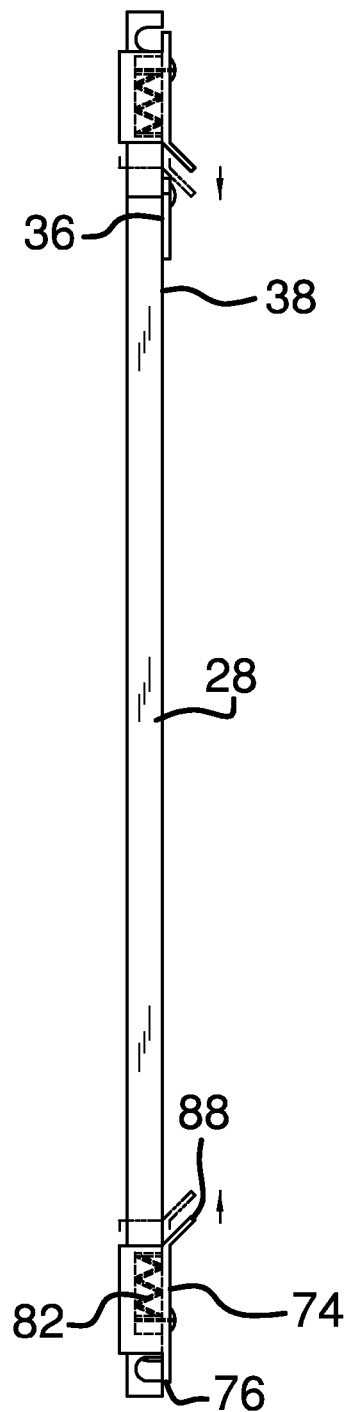
FIG. 5 is a right side view of an embodiment of the disclosure.

With reference now to the drawings, and in particular to FIGS. 1 through 6 thereof, a new towing device embodying the principles and concepts of an embodiment of the disclosure and generally designated by the reference numeral 10 will be described.

As best illustrated in FIGS. 1 through 6, the towing assembly 10 generally comprises a hitch 12. The hitch 12 has a first end 14 and a second end 16. The second end 16 of the hitch 12 is open. The first end 14 is coupled to a hitch receiver 18 on a first cart 20 to facilitate towing of a second cart 22 with the first cart 20. The first cart 20 may be an electrical mobility cart or the like. The second cart 22 may be a shopping cart or the like.

A ring 24 is coupled to and extends longitudinally away from the second end 16 of the hitch 12. The ring 24 lies on a plane that is planar with a top surface 26 of the hitch 12. A first rod 28 is provided. A second rod 30 is provided.

A pivot 32 is provided. The pivot 32 comprises a plate 34. A bottom side 36 of the plate 34 is coupled to a top side 38 of the second rod 30. Moreover, the plate 34 extends beyond each of a first end 40 of the second rod 30 and a first lateral side 42 of the second rod 30. A pin 44 extends through the plate 34 proximate a distal corner 46 of the plate 34 with respect to the second rod 30.

The pin 44 engages an upper side 48 of the first rod 28 proximate a first end 50 of the first rod 28. Thus, the second rod 30 is pivotally coupled to the first rod 28. The second rod 30 is positionable in a stored position that has the second rod 30 being coextensive with the first rod 28. The second rod 30 is positionable in the deployed position that has the second rod 30 angling away from the first rod 28 to form a V-shape.

A first latch 52, a second latch 54 and a third latch 56 are provided. Each of the latches 52,54,56 comprises a respective outer surface 58 extending between each of a respective primary end 60 and a respective secondary end 62 of the latches 52,54,56. A bottom side 64 of the outer surface 58 has a groove 66 extending upwardly therein. The groove 66 extends between each of a first lateral side 68 and a second lateral side 70 of the outer surface 58. Additionally, the bottom side 64 has a well 72 extending upwardly therein. The well 72 extends between the groove 66 and the secondary end 62.

A respective cover 74 is slidably coupled to the bottom side 64 of the outer surface 58 of the latches 52,54,56. The cover 74 has a forward end 76 and a rearward end 78. The cover 74 is bent so the rearward end 78 is directed away from the outer surface 58 of the associated latch 52,54,56. The cover 74 is positionable in a closed position such that the cover 74 covers the groove 66. The cover 74 is positionable in an open position such that the groove 66 is exposed.

A respective pin 80 extends through each of the covers 74 and extends into the well 72. A respective spring biasing member 82 is positioned within the well 72. The spring biasing member 82 engages the pin 80 in the cover 74 such that the spring biasing member 82 urges the cover 74 into the closed position.

The secondary end 62 of the first latch 52 is coupled to the first end 50 of the first rod 28. The groove 66 in the first latch 52 may insertably receive the ring 24 to facilitate the first rod 28 being quickly coupled and de-coupled with the ring 24. The first latch 52 is slidably coupled to the ring 24 such that the first rod 28 may freely travel along the ring 24. The secondary end 62 of the second latch 54 is coupled to a second end 84 of the first rod 28. The groove 66 in the second latch 54 may insertably receive a frame 86 of the second cart 22 to facilitate the first rod 28 being quickly coupled and de-coupled with the frame 86 of the second cart 22. The secondary end 62 of the third latch 56 is coupled to a second end 88 of the second rod 30. The groove 66 may insertably receive the frame 86 of the second cart 22 after the second arm 30 is positioned in the deployed position. The second rod 30 may be quickly coupled and un-coupled with the frame 86 of the second cart 22.

In use, the assembly 10 may be used in a grocery store or other similar retail environment. The second rod 30 is positioned in the deployed position. Each of the covers 74 on the first latch 52, the second latch 54 and the third latch 56 are positioned in the open position to couple the latches 52,54,56 to an associated one of the ring 24 and the frame 86 of the second cart 22. The first cart 20 is used to tow the second cart 22. The assembly 10 allows a conventional shopping cart to be attached to a wheelchair type cart which may have s small basket.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A towing assembly comprising:
a hitch configured to be removably coupled to a first cart, said hitch having a first end and a second end, said second end of said hitch being open, said first end being coupled to a hitch receiver on the first cart;
a first rod being removably coupled between said hitch and a second cart to facilitate towing of the second cart with the first cart, said first rod being structured to be quickly coupled and de-coupled from the first cart and the second cart;
a pivot coupled to said first rod;
a second rod coupled to said pivot such that said second rod is pivotally coupled to said first rod, said second rod being positionable in a deployed position with respect to said first rod, said second rod being removably coupled to the second cart, said second rod being structured to be quickly coupled and de-coupled from the second cart; and
a ring coupled to and extending longitudinally away from said second end of said hitch, said ring lying on a plane being planar with a top surface of said hitch.

2. The assembly according to claim 1, wherein said pivot comprising:
a plate, a bottom side of said plate being coupled to a top side of said second rod such that said plate extends beyond each of a first end of said second rod and a first lateral side of said second rod;
a pin extending through said plate proximate a distal corner of said plate with respect to said second rod, said pin engaging an upper side of said first rod;
said second rod being positionable in a stored position having said second rod being coextensive with said first rod; and
said second rod being positionable in said deployed position having said second rod angling away from said first rod such to form a V-shape.

3. A towing assembly comprising:
a hitch configured to be removably coupled to a first cart;
a first rod being removably coupled between said hitch and a second cart to facilitate towing of the second cart with the first cart, said first rod being structured to be quickly coupled and de-coupled from the first cart and the second cart;
a pivot coupled to said first rod;
a second rod coupled to said pivot such that said second rod is pivotally coupled to said first rod, said second rod being positionable in a deployed position with respect to said first rod, said second rod being removably coupled to the second cart, said second rod being structured to be quickly coupled and de-coupled from the second cart; and
a first latch, a second latch and a third latch, each of said latches comprising
a respective outer surface extending between each of a respective primary end and a respective secondary end of said latches,
a bottom side of said outer surface having a groove extending upwardly therein such that said groove extends between each of a first lateral side and a second lateral side of said outer surface, said groove being positioned proximate said primary end, and
said bottom side having a well extending upwardly therein, said well extending between said groove and said secondary end.

4. The assembly according to claim 3, further comprising:
a respective cover slidably coupled to said bottom side such that said cover covers said well, said cover being positionable in a closed position such that said cover covers said groove, said cover being positionable in an open position such that said groove is exposed; and
a respective spring biasing member positioned within said well, said spring biasing member engaging said cover such that said spring biasing member urges said cover into said closed position.

5. The assembly according to claim 4, further comprising:
said secondary end of said first latch being coupled to a first end of said first rod wherein said groove is configured to insertably receive a ring on said hitch, said first latch being slidably coupled to said ring such that said first rod may freely travel along said ring;
said secondary end of said second latch being coupled to a second end of said first rod wherein said groove is configured to insertably receive a frame of the second cart; and
said secondary end of said third latch being coupled to a second end of said second rod wherein said groove is configured to insertably receive the frame of the second cart.

6. A towing assembly comprising:
a hitch, said hitch having a first end and a second end, said second end of said hitch being open, said first end being coupled to a hitch receiver on a first cart to facilitate towing of a second cart with the first cart;
a ring coupled to and extending longitudinally away from said second end of said hitch, said ring lying on a plane being planar with a top surface of said hitch;
a first rod;
a second rod;
a pivot, said pivot comprising
a plate, a bottom side of said plate being coupled to a top side of said second rod such that said plate extends beyond each of a first end of said second rod and a first lateral side of said second rod, and a pin extending through said plate proximate a distal corner of said plate with respect to said second rod, said pin engaging an upper side of said first rod wherein said second rod is pivotally coupled to said first rod, said pin being positioned proximate a first end of said first rod;

said second rod being positionable in a stored position having said second rod being coextensive with said first rod;

said second rod being positionable in said deployed position having said second rod angling away from said first rod such to form a V-shape;

a first latch, a second latch and a third latch, each of said latches comprising a respective outer surface extending between each of a respective primary end and a respective secondary end of said latches, a bottom side of said outer surface having a groove extending upwardly therein such that said groove extends between each of a first lateral side and a second lateral side of said outer surface, said groove being positioned proximate said primary end, said bottom side having a well extending upwardly therein, said well extending between said groove and said secondary end, a cover slidably coupled to said bottom side such that said cover covers said well, said cover being positionable in a closed position such that said cover covers said groove, said cover being positionable in an open position such that said groove is exposed, and a spring biasing member positioned within said well, said spring biasing member engaging said cover such that said spring biasing member urges said cover into said closed position;

said secondary end of said first latch being coupled to said first end of said first rod wherein said groove is configured to insertably receive said ring to facilitate said first rod being quickly coupled and de-coupled with said ring, said first latch being slidably coupled to said ring such that said first rod may freely travel along said ring;

said secondary end of said second latch being coupled to a second end of said first rod wherein said groove is configured to insertably receive a frame of the second cart to facilitate said first rod being quickly coupled and de-coupled to the frame with the second cart; and said secondary end of said third latch being coupled to a second end of said second rod wherein said groove is configured to insertably receive the frame of the second cart after said second arm is positioned in said deployed position to facilitate said second rod being quickly coupled and un-coupled with the frame of the second cart.

* * * * *